US010992180B2

(12) United States Patent
Heinrich et al.

(10) Patent No.: US 10,992,180 B2
(45) Date of Patent: Apr. 27, 2021

(54) DEVICE FOR INDUCTIVELY TRANSFERRING ELECTRICAL ENERGY AND/OR DATA, AND METHOD FOR PRODUCING SUCH A DEVICE

(71) Applicant: Balluff GmbH, Neuhausen (DE)

(72) Inventors: Joerg Heinrich, Duerrlewang (DE); David Maier, Buehl (DE); Nejila Parspour, Gerlingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 16/817,772

(22) Filed: Mar. 13, 2020

(65) Prior Publication Data

US 2020/0295599 A1 Sep. 17, 2020

(30) Foreign Application Priority Data

Mar. 15, 2019 (DE) ..................... 10 2019 106 716.2

(51) Int. Cl.
*H01F 27/28* (2006.01)
*H02J 50/10* (2016.01)
(Continued)

(52) U.S. Cl.
CPC .......... *H02J 50/10* (2016.02); *H01F 27/2804* (2013.01); *H02J 50/70* (2016.02);
(Continued)

(58) Field of Classification Search
CPC . H02J 50/10; H02J 50/80; H02J 50/70; H01F 27/2804; H04B 5/0031; H04B 5/0037; H03B 5/0081
See application file for complete search history.

(56) References Cited

U.S. PATENT DOCUMENTS 7,042,325 B2 * 5/2006 Giandalia ........... H01F 17/0013 336/200
7,081,803 B2 * 7/2006 Takaya ................ H01F 17/0033 336/200
(Continued)

FOREIGN PATENT DOCUMENTS

DE 20 2007 011 745 U1 12/2007
DE 20 2009 009 689 U1 11/2010
(Continued)

OTHER PUBLICATIONS

German Office Action dated Jan. 8, 2020 in German Application No. 10 2019 106 716.2 with English translation of the relevant parts.
(Continued)

*Primary Examiner* — Dinh T Le
(74) *Attorney, Agent, or Firm* — Collard & Roe, P.C.

(57) ABSTRACT

A device for inductively transferring electrical energy and/or data from a primary-sided carrier to at least one positionable secondary-sided recipient includes at least one primary-sided coil arrangement, which inductively interacts with at least one secondary-sided coil arrangement. Meander-shaped windings of a predeterminable winding number of the primary-sided and/or secondary-sided coil arrangement are arranged on at least one flexible carrier by embroidering a high frequency strand, and the meander-shaped windings have straight courses in the region of crossovers of the embroidered high frequency strands.

5 Claims, 4 Drawing Sheets

(51) Int. Cl.
*H02J 50/80* (2016.01)
*H02J 50/70* (2016.01)
*H04B 5/00* (2006.01)

(52) U.S. Cl.
CPC ............ *H02J 50/80* (2016.02); *H04B 5/0031* (2013.01); *H04B 5/0037* (2013.01); *H04B 5/0081* (2013.01)

(56) References Cited

U.S. PATENT DOCUMENTS

| | | | | |
|---|---|---|---|---|
| 7,652,469 | B2 * | 1/2010 | Meyer .................... | G01D 5/202<br>324/207.17 |
| 8,643,219 | B2 * | 2/2014 | Yabe .................... | H04B 5/0037<br>307/104 |
| 9,643,505 | B2 | 5/2017 | Ichikawa et al. | |
| 9,649,946 | B2 | 5/2017 | Ichikawa et al. | |
| 9,826,670 | B2 | 11/2017 | Nakamura et al. | |
| 2010/0314946 | A1 | 12/2010 | Budde et al. | |
| 2015/0054354 | A1 | 2/2015 | Lemmens et al. | |
| 2015/0276965 | A1 | 10/2015 | Turki | |
| 2019/0325731 | A1 | 10/2019 | Gaggero et al. | |

FOREIGN PATENT DOCUMENTS

| | | | |
|---|---|---|---|
| DE | 10 2012 108 671 | A1 | 5/2014 |
| DE | 11 2013 001 910 | T5 | 12/2014 |
| DE | 10 2013 219 527 | A1 | 4/2015 |
| DE | 11 2013 004 469 | T5 | 5/2015 |
| DE | 11 2013 006 982 | T5 | 4/2016 |
| DE | 10 2015 005 871 | A1 | 1/2017 |
| DE | 10 2016 202 047 | A1 | 8/2017 |
| DE | 10 2018 109 267 | A1 | 10/2019 |
| EP | 2 428 969 | B1 | 10/2016 |
| WO | 2016/078814 | A1 | 5/2016 |

OTHER PUBLICATIONS

German Office Action dated Jan. 8, 2020 in German Application No. 10 2019 106 719.7 with English translation of the relevant parts.

German Office Action dated Jan. 13, 2020 in German Application No. 10 2019 106 720.0 with English translation of the relevant parts.

David Maier, Jöorg Heinrich, Marco Zimmer, Marcel Maier, Nejila Parspour, "Contribution to the System Design of Contactless Energy Transfer Systems," IEEE Transactions on Industry Applications, vol. 55, No. 1, Jan./Feb. 2019, total of 11 pages (https://ieeexplore.ieee.org/document/8440726).

Marcel Maier, David Maier, Marco Zimmer, Nejila Parspour, "A Novel Self Oscillating Power Electronics for Contactless Energy Transfer and Frequency Shift Keying Modulation," International Symposium on Power Electronics, Electrical Drives, Automation and Motion (SPEEDAM), Anacapri, Italy, Jun. 2016, pp. 67-72, total of 6 pages.

* cited by examiner

DEVICE FOR INDUCTIVELY TRANSFERRING ELECTRICAL ENERGY AND/OR DATA, AND METHOD FOR PRODUCING SUCH A DEVICE

CROSS REFERENCE TO RELATED APPLICATIONS

Applicant claims priority under 35 U.S.C. § 119 of German Application No. 10 2019 106 716.2 filed Mar. 15, 2019, the disclosure of which is incorporated by reference.

BACKGROUND OF THE INVENTION

1. Field of the Invention

The invention relates to a device for inductively transferring electrical energy and/or data.

Furthermore, the invention relates to a method for producing a device for inductively transferring electrical energy and/or data.

2. Description of the Related Art

Devices for inductively transferring electrical energy are known from the prior art.

Thus, for example, a device for inductively transferring electrical energy from a stationary unit having at least one primary inductivity to a vehicle adjacent thereto having at least one secondary inductivity emerges from DE 20 2009 009 689 U1. DE 10 2015 005 871 A1 describes a system for contactless energy transfer from an underground primary conductor to a vehicle standing on the ground, in particular, wherein the vehicle has a secondary winding arrangement that can be inductively coupled to the primary conductor.

In the industrial sector, sensors and actuators are arranged on fastening elements, which are formed, for example, as so-called active rods, by means of which energy and/or data are transferred to sensors, for example, by means of an electromagnetic coupling method. Such a fastening element emerges from non-prepublished DE 10 2018 109 267.9 of the applicant.

In the field of inductive energy transfer, new concepts for windings are increasingly necessary for new applications. Thus, encircling coils in a planar design that are easy to produce, for example, are not suitable for three-dimensional arrangements.

Embroidering strands onto a carrier material made of fabric or a different material is known from the prior art. For example, heated seats for vehicles are produced in this way. When embroidering strands, it is necessary to draft a suitable winding pattern which can be converted by an embroidery machine. Here, no errors may arise when embroidering if an inductive energy transfer is to be guaranteed.

Here, an error means, for example, that a high frequency strand is damaged by the embroidery machine. Mechanical loads during the embroidering process can also reduce the quality of the coils. Moreover, severing individual single wires leads to a drop in coil quality, whereby such a coil can no longer be used. Such a severing takes place, for example, by means of a puncture when embroidering, wherein the probability of the emergence of such an error increases, in particular, with complex arrangements.

The object of the invention is thus to convey an effectively functioning device for the inductive transfer of electrical energy and/or of data, with which embroidered coil arrangements are used, and a method for the production of such a device, which enables a coil arrangement on a flexible carrier material that can be reliably produced. In particular, the production of the coil windings using a conventional embroidery machine shall be possible without damages.

SUMMARY OF THE INVENTION

Using a device for the inductive transfer of electrical energy and/or of data having the features according to one aspect of the invention, a reliable energy and/or data transfer is possible. The method for producing such a device having the features according to another aspect of the invention enables the reliable and safe production of a meander-shaped winding on at least one flexible carrier by embroidering a high frequency strand.

Here, it is provided according to the invention that meander-shaped windings of a predeterminable winding number of the coil arrangement have straight courses in the region of crossovers of the embroidered high frequency strands. A winding pattern produced in this way minimizes crossings and enables a safe production of windings on flexible carriers by embroidery machines.

According to an aspect of the invention, it is provided that the meander-shaped windings are not embroidered in the region of the crossovers. In this way, damage to the high frequency strands during the embroidering process and thus a reduction of the coil quality can be reliably prevented.

A particularly advantageous embodiment of the invention provides that the individual windings of the plurality of identical meander-shaped windings are arranged in such a way on the at least one flexible carrier relative to at least one folding line that the meander-shaped windings come to rest one above the other offset in relation to each other by folding together the flexible carrier along the at least one folding line.

In this way, very complex winding patterns can be generated, and the transfer of energy and/or data is optimized by such an arrangement.

In particular, such carriers can also be arranged to be curved, for example, for example on an inherently known fixing rod for sensors.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
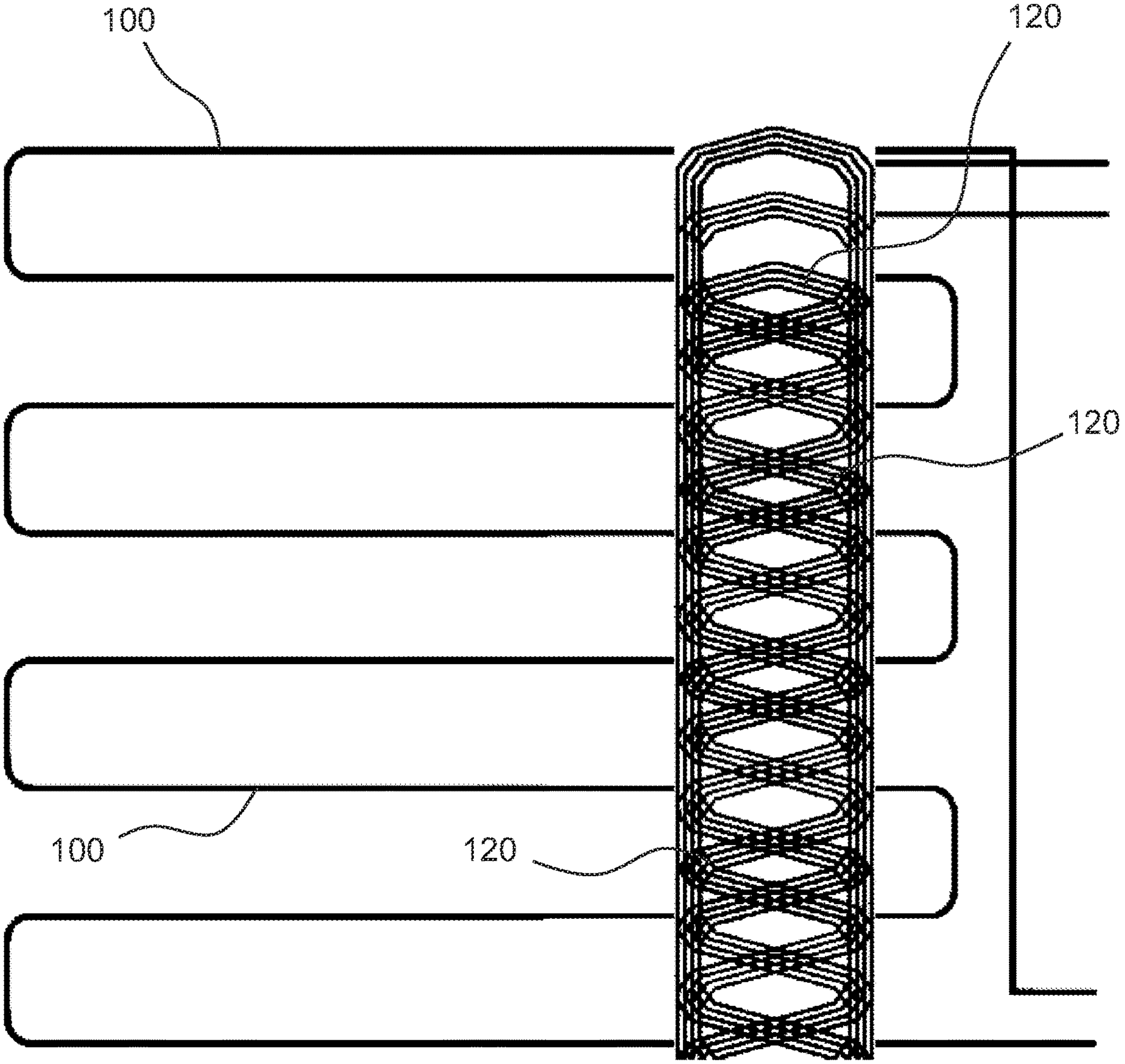
FIG. 1 shows primary-sided and secondary-sided windings for energy transfer to positionable recipients.

In FIG. 1, the energy transfer to positionable recipients is schematically depicted.

Energy is inductively transferred from a primary-sided meander-shaped winding 100 to secondary-sided meander-shaped windings 120. Both the primary-sided winding and the secondary-sided winding are arranged on a flexible carrier. The meander-shaped winding system of the primary-sided winding is exemplarily depicted in FIG. 1 having one winding. The secondary-sided windings are exemplarily depicted having the winding number 3. Here, the route from left to right corresponds to a length of a rod and the route from above to below to the length of the peripheral surface of the cylinder.

Figure 2:
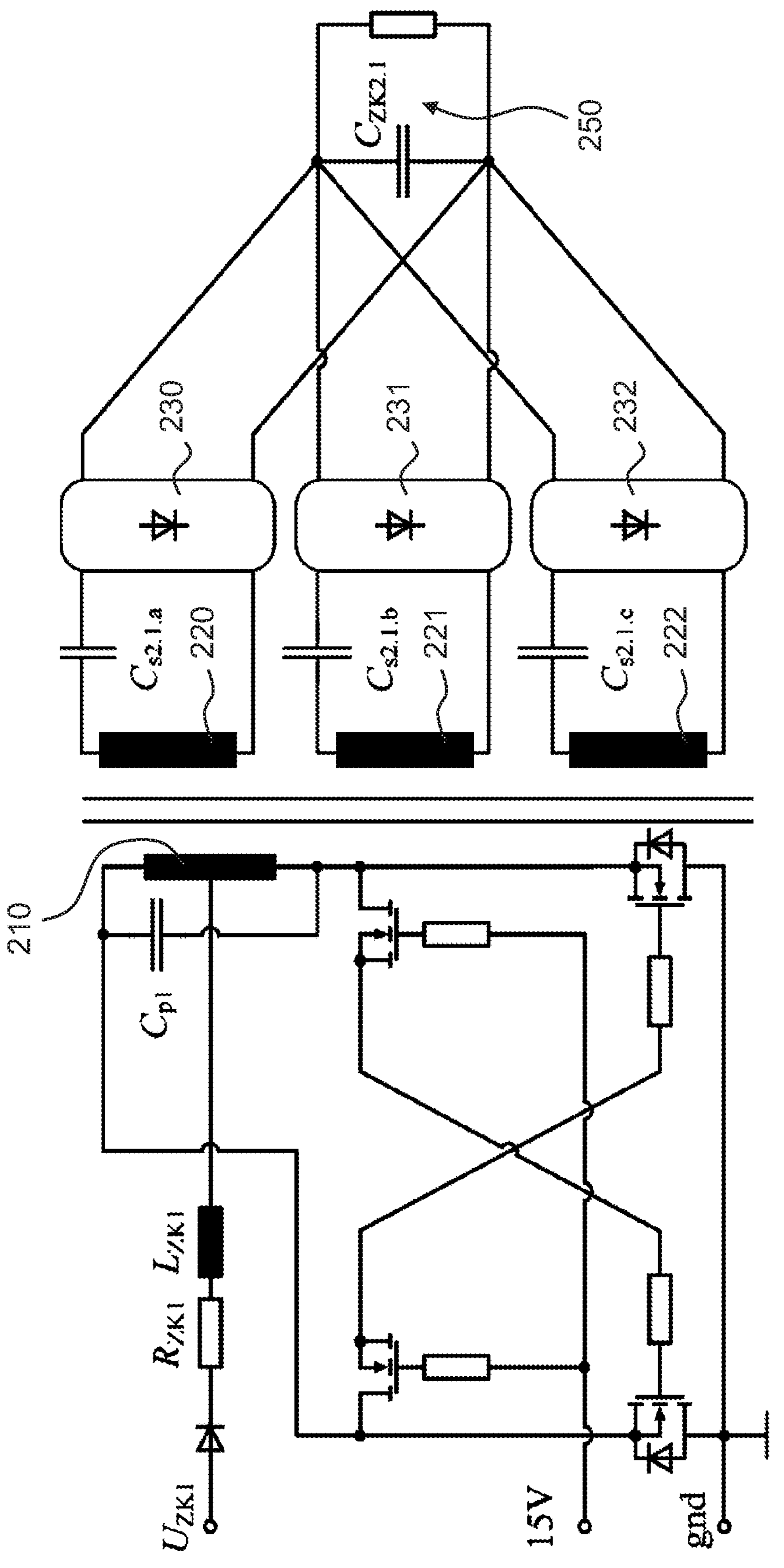
FIG. 2 schematically shows a circuit and offset windings for energy transfer.

The inductive energy transfer can take place, for example, with a circuit depicted in FIG. 2. Here, three secondary-sided inductivities 220, 221, 222 lie opposite one primary-sided inductivity 210. A compensation circuit and a rectifier 230, 231, 232 are allocated to each of the secondary-sided inductivities. Depending on the position of the recipient (rotationally), the windings are passed through differently by the magnetic field.

Due to the geometric construction, one winding will always have the highest induced voltage or the greatest magnetic coupling to the primary side. An intermediate circuit 250 is then supplied by this winding, whereby a constant energy transfer can take place.

Figure 3:
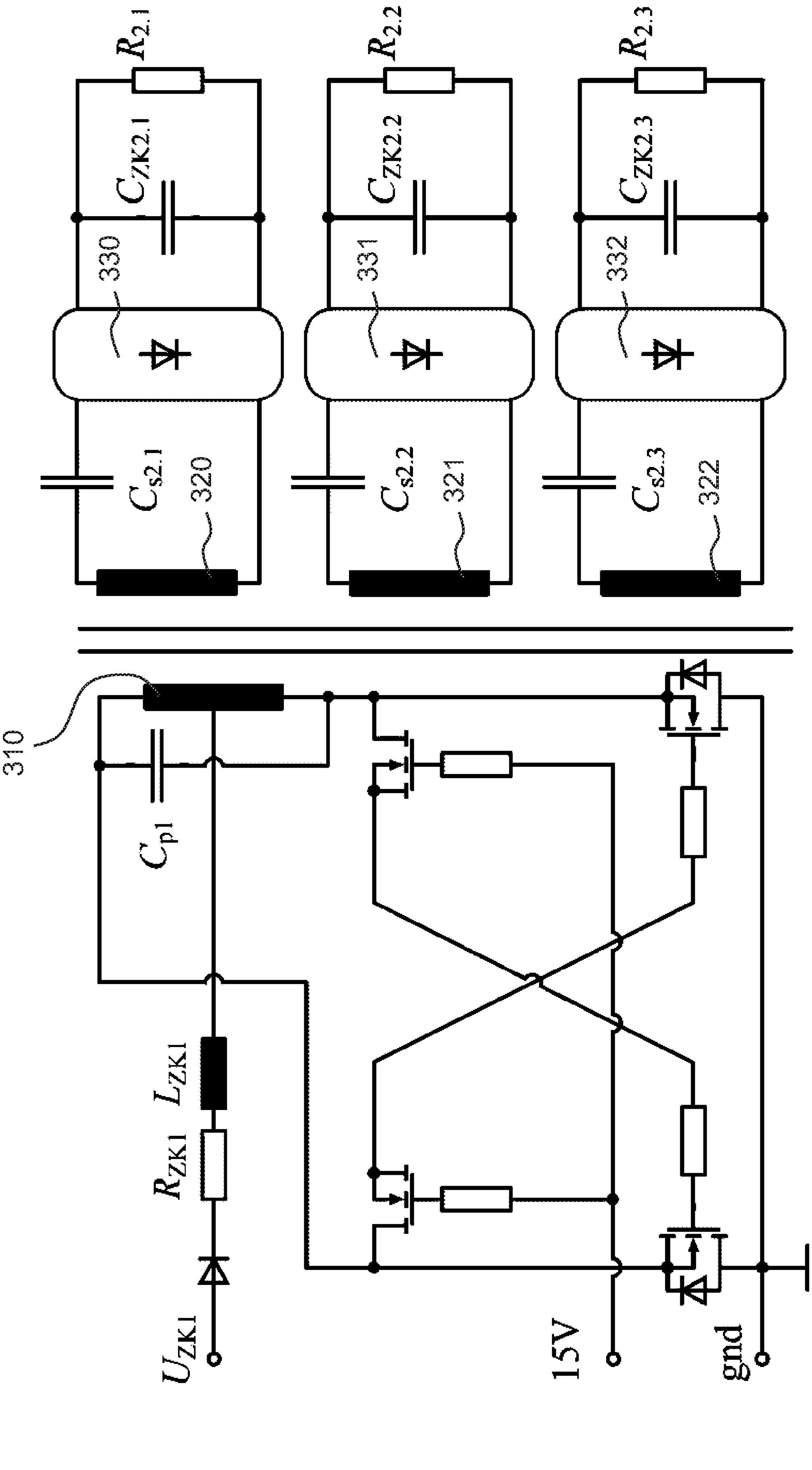
FIG. 3 schematically shows an autoresonant Royer oscillator having several serially compensated secondary sides for inductively transferring energy and data.

A different kind of energy transfer is depicted in FIG. 3, which shows a so-called autoresonant Royer oscillator having several serially compensated secondary sides. Three secondary inductivities 320, 321, 322 and corresponding rectifiers 330, 331, 332 are allocated to a primary inductivity 310. The advantage of this circuit is that 1 to n recipients having different power can be placed on a rod or on a surface, for example. No additional regulation measures are necessary by an autoresonant power electronics system. The resonance frequency is independent of load. The recipients function in the auxiliary operation.

Figure 4:
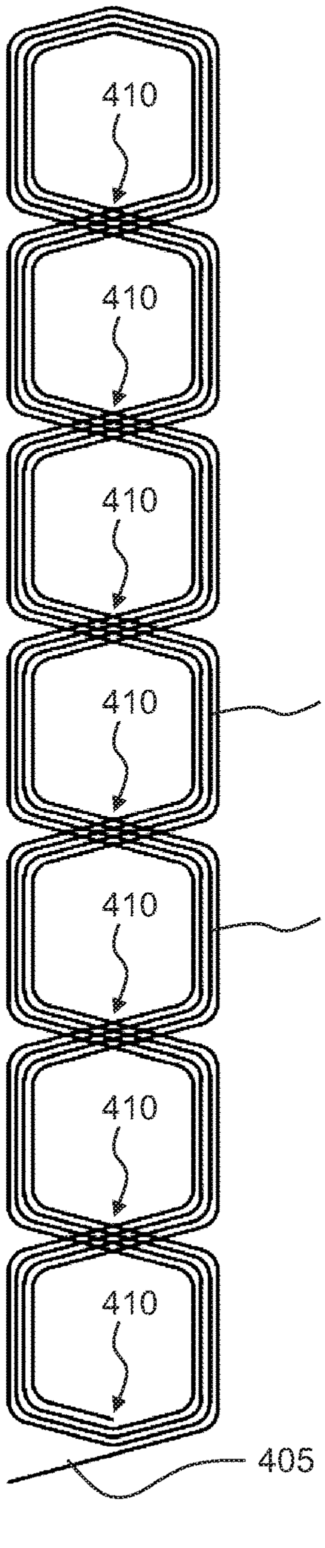
FIG. 4 shows a meander winding in a simple design having the winding number 3 according to an exemplary embodiment of the invention.
Figure 5:
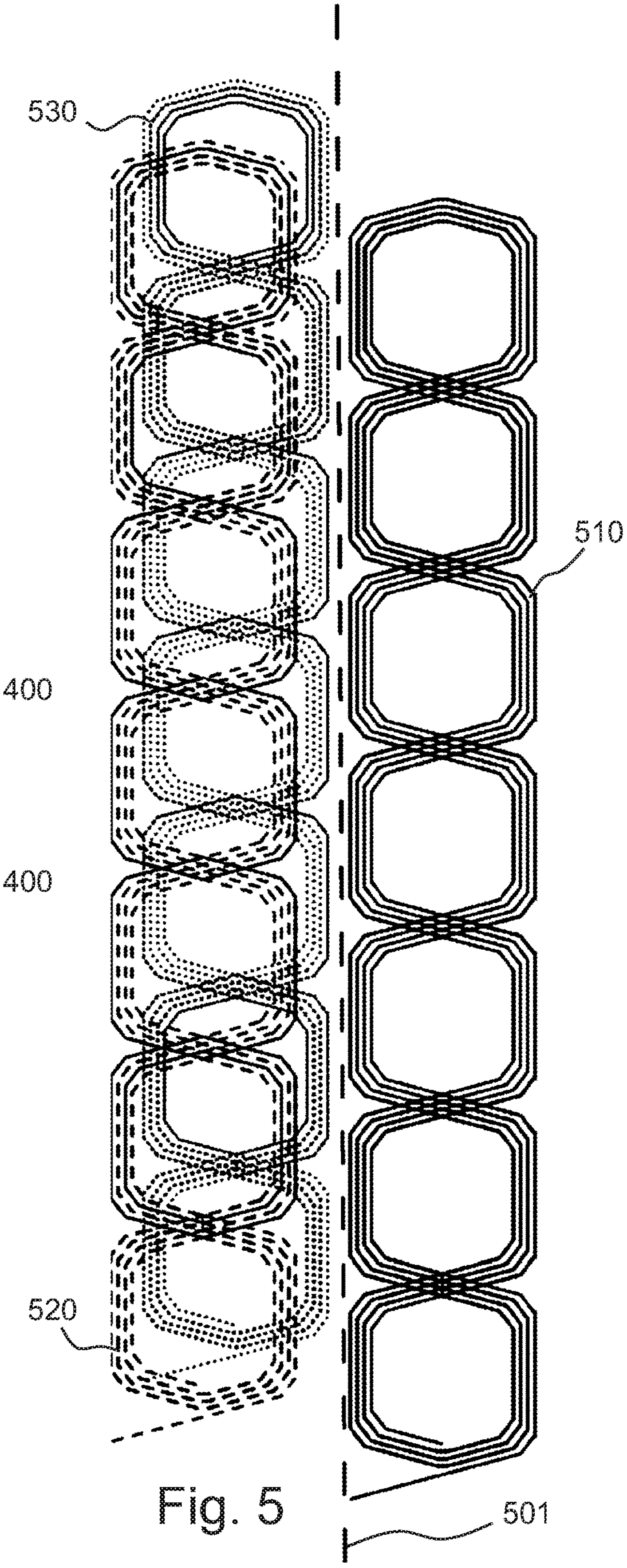
FIG. 5 shows the arrangement of three meander windings each having the winding number 3, which come to rest one above the other after folding the flexible carrier along a folding line.

The windings provided for this are depicted in FIGS. 4 and 5.

In FIG. 4, a meander winding 400 having the winding number 3 is depicted. This meander winding 400 is generated by embroidering a high frequency strand 405 using an inherently known embroidery machine onto a flexible material, for example fabric or a different carrier material. For embroidering the strand, it is necessary to draft a winding pattern, which, on one hand, can be converted by the embroidery machine and which, on the other hand, is not subject to damage during the embroidering process. In particular in the region of the inductive energy transfer, namely no errors can occur when embroidering. Here, error means that the high frequency strand is damaged by the embroidery machine. Moreover, when applying the high frequency strand, i.e. when "winding", the mechanical load may not be so great such that the quality of a coil is disadvantageously reduced. Moreover, during the embroidering process, the case must not arise that individual single wires are severed, which leads to a very large deterioration in coil quality, whereby the produced product can no longer be used for energy transfer. Such a puncture when embroidering can occur, in particular, with very complex arrangements. The probability of such a puncture increases with the complexity of the arrangement.

The winding depicted in FIG. 4 is a meander-shaped arrangement for a three-dimensional construction, which has the great advantage that crossovers 410 are minimized. The crossovers 410 always lie within straight courses of the strand. The embroidering process is here chosen in such a way that a customary embroidery machine skips these regions during the embroidering process. The strand remains stationary without additional punctures, which lie in the region of the crossovers.

In order to ensure the necessary proximity of single strands to one another, according to a particularly advantageous embodiment, which is depicted in FIG. 5, it is provided that identical meander-shaped windings 510, 520, 530 are arranged on flexible carriers relative to a folding line 501 or (not depicted) further folding lines in such a way that the meander-shaped windings 510, 520, 530 come to rest one above the other offset in relation to one another after folding together the flexible carriers along the line. In this way, very complex winding structures are generated, which can be safely and reliably produced.

Such an arrangement enables a very effective transfer of electrical energy and of data.

Although only a few embodiments of the present invention have been shown and described, it is to be understood that many changes and modifications may be made thereunto without departing from the spirit and scope of the invention.

What is claimed is:

1. A device for inductively transferring electrical energy and/or data from a primary-sided carrier to at least one positionable secondary-sided recipient comprising at least one primary-sided coil arrangement; and at least one secondary-sided coil arrangement;

wherein the at least one primary-sided coil arrangement transfers the electrical energy and/or data to the at least one secondary-sided coil arrangement by electromagnetic induction;

wherein the at least one primary-sided coil arrangement or the at least one secondary-sided coil arrangement comprises an embroidered high frequency strand configured to carry electrical energy and/or data and with a predeterminable winding number embroidered on at least one flexible carrier so as to have meander-shaped windings with crossover regions where a first portion of the embroidered high frequency strand crosses over a second portion of the embroidered high frequency strand; and wherein the meander-shaped windings are not embroidered in the crossover regions so as to have straight courses without punctures in the at least one flexible carrier in the crossover regions of the embroidered high frequency strand.

2. The device according to claim 1, wherein the individual windings of several identical meander-shaped windings are arranged on the at least one flexible carrier in relation to at least one folding line in such a way that the meander-shaped windings come to rest one above the other offset in relation to one another by folding together the at least one flexible carrier along the at least one folding line.

3. A method for producing a device for inductively transferring electrical energy and/or data, comprising:

providing first and second flexible carriers; and embroidering first and second high frequency strands configured to carry electrical energy and/or data on the first and second flexible carriers so that the first flexible carrier has a primary-sided coil arrangement comprising an embroidered first high frequency strand configured to have a primary-sided meander-shaped winding with crossover regions where a first portion of the embroidered first high frequency strand crosses over a second portion of the embroidered first high frequency strand and the second flexible carrier has at least one secondary-sided coil arrangement comprising an embroidered second high frequency strand configured to have at least one secondary-sided meander-shaped winding with crossover regions where a first portion of the embroidered second high frequency strand crosses over a second portion of the embroidered second high frequency strand;

wherein the primary-sided meander shaped winding and the at least one secondary-sided meander-shaped winding are not embroidered on the first and second carriers in the crossover regions so as to have straight courses without punctures in the first and second carriers in the crossover regions.

4. The method according to claim 3, further comprising arranging several identical secondary-sided meander-shaped windings on the second flexible carrier by embroidering.

5. The method according to claim 4, further comprising embroidering the secondary-sided meander-shaped windings relative to at least one folding line onto the second flexible carrier in such a way that the secondary-sided meander-shaped windings come to rest one above the other offset in relation to one another by folding together the second flexible carrier along the at least one folding line.

* * * * *